US008648267B2

(12) United States Patent
Honda et al.

(10) Patent No.: US 8,648,267 B2
(45) Date of Patent: Feb. 11, 2014

(54) WEIGHT MEASUREMENT DEVICE WITH LOAD TRANSMISSION MEMBER WHOSE POSITION IS CHANGEABLE

(75) Inventors: Akihisa Honda, Itabashi-ku (JP); Minoru Hatakeyama, Bunkyo-ku (JP)

(73) Assignee: Tanita Corporation, Itabashi-ku, Tokyo (JP)

( * ) Notice: Subject to any disclaimer, the term of this patent is extended or adjusted under 35 U.S.C. 154(b) by 502 days.

(21) Appl. No.: 13/005,362

(22) Filed: Jan. 12, 2011

(65) Prior Publication Data
US 2011/0209927 A1 Sep. 1, 2011

(30) Foreign Application Priority Data
Feb. 26, 2010 (JP) ................................. 2010-043408

(51) Int. Cl.
G01G 21/12 (2006.01)
G01G 21/02 (2006.01)
G01G 21/07 (2006.01)
G01L 1/26 (2006.01)

(52) U.S. Cl.
USPC .. 177/211; 177/225; 177/DIG. 9; 73/862.474

(58) Field of Classification Search
USPC ................. 177/211, 225, DIG. 9; 73/862.474
See application file for complete search history.

(56) References Cited

U.S. PATENT DOCUMENTS

| 2,472,047 | A | * | 5/1949 | Ruge | 73/862.622 |
|---|---|---|---|---|---|
| 3,284,749 | A | * | 11/1966 | Fouretier | 338/5 |
| 3,587,761 | A | * | 6/1971 | Mendon | 177/134 |
| 3,621,927 | A | * | 11/1971 | Ormond | 177/211 |
| 3,915,248 | A | * | 10/1975 | Paelian | 177/210 R |
| 3,993,150 | A | | 11/1976 | Brosh et al. | |
| 4,248,317 | A | | 2/1981 | Rahav | |
| 4,433,741 | A | * | 2/1984 | Ryckman, Jr. | 177/199 |
| 4,800,973 | A | * | 1/1989 | Angel | 177/211 |
| 4,939,938 | A | * | 7/1990 | Soderholm | 73/862.471 |

(Continued)

FOREIGN PATENT DOCUMENTS

| EP | 1 925 920 A1 | 5/2008 |
|---|---|---|
| EP | 2 081 002 A1 | 7/2009 |
| JP | 2003-307454 A | 10/2003 |
| JP | 2004-156937 A | 6/2004 |

OTHER PUBLICATIONS

European Search Report dated Apr. 26, 2011, issued by the European Patent Office in corresponding European Patent Application No. 11 15 0624.

Primary Examiner — Randy W Gibson
(74) Attorney, Agent, or Firm — Buchanan Ingersoll & Rooney P.C.

(57) ABSTRACT

A weight measurement device has a housing that includes a base, a platform located above the base and on which a subject is placed or stands, and a chamber defined by the base and the platform. At least one load cell is contained in the chamber and is supported by the base. A load transmission member is located between the platform and the load cell. A bracket is fixed to the base. An elastic deformation part is located around the load transmission member and connected to the bracket and to the load transmission member. The elastic deformation part has an elasticity that is greater than that of the load transmission member, and allows the load transmission member to change in position with respect to the bracket when force is transmitted from the platform via the load transmission member to the load cell.

1 Claim, 6 Drawing Sheets

(56) References Cited

U.S. PATENT DOCUMENTS

| | | |
|---|---|---|
| 4,960,177 A | 10/1990 | Holm-Kennedy et al. |
| 5,929,391 A | 7/1999 | Petrucelli et al. |
| 6,005,199 A * | 12/1999 | Harada et al. ............... 177/211 |
| 2003/0159858 A1 * | 8/2003 | Aumard ..................... 177/199 |
| 2004/0083825 A1 | 5/2004 | Tsutaya |
| 2006/0065450 A1 | 3/2006 | Germanton |
| 2006/0137916 A1 * | 6/2006 | Axakov et al. ............ 177/201 |

\* cited by examiner

WEIGHT MEASUREMENT DEVICE WITH LOAD TRANSMISSION MEMBER WHOSE POSITION IS CHANGEABLE

BACKGROUND OF THE INVENTION

1. Field of the Invention

The present invention relates to weight measurement devices, for example, weighing scales.

2. Related Art

In a conventional weighing scale, there may be a chamber defined by a base and a platform on which a subject stands, and one or more load cells are contained in the chamber as disclosed in JP 2003-307454-A and JP 2004-156937-A. The load cell generates an electric signal due to the weight exerted on the platform. On the basis of the electric signal, the amount of weight on the platform is calculated.

The load cell incorporates a flexure element having a fulcrum point supported with respect to the base and a force point (application point of the force) coupled to the platform. When a load is applied to the force point from the platform, the part of the flexure element between the force point and the fulcrum point deforms, and the degree of deformation is measured with a suitable element, for example, a strain gauge.

In the technique described in JP 2003-307454-A, an elastic member is interposed between the platform and the flexure element. This elastic member maintains the connection between the platform and the flexure element, and allows the platform to change its position with respect to the flexure element. However, in order to secure a sufficient deformation, the elastic member must have a considerable thickness. This results in enlargement of the entire thickness of the weight measurement device, such as a weighing scale. In particular, if the elastic member is made of rubber, it is necessary to increase the thickness since the rubber will harden.

Accordingly, the present invention provides a weight measurement device in which the thickness can be reduced significantly.

SUMMARY OF THE INVENTION

According to the present invention, there is provided a weight measurement device including: a housing including a base, a platform located above the base and on which a subject is placed or stands, and a chamber defined by the base and the platform; at least one load cell contained in the chamber and supported by the base; a load transmission member located between the platform and the load cell; a bracket fixed to the base; and an elastic deformation part located around the load transmission member and connected to the bracket and to the load transmission member, the elastic deformation part having an elasticity that is greater than that of the load transmission member, in which the elastic deformation part allows the load transmission member to change in position with respect to the bracket when force is transmitted from the platform via the load transmission member to the load cell.

In the weight measurement device, when a weight is applied to the platform, the weight is transmitted to the load transmission member. The load transmission member having less elasticity transmits the entire load exerted on the load transmission member 19 to the load cell with negligible loss of the load. As a result, the load cell can generate an electric signal that is accurately responsive to the weight exerted thereon. By virtue of the elastic deformation part having greater elasticity located around the load transmission member, the position (height and orientation (angle)) of the load transmission member is changeable due to deformation of the platform. Since the position of the load transmission member is not bound rigidly by the elastic deformation part having greater elasticity, the entire load exerted on the load transmission member is transmitted to the load cell with negligible loss of the load. The elastic deformation part is located around the load transmission member, and the elastic deformation part and any other large-deformation element are not interposed between the platform and the load cell. Therefore, the space between the platform and the base can be minimized, so that the weight measurement device is made thinner.

The weight measurement device may further include: a flexure element incorporated in the load cell and including a force point onto which force is applied from the load transmission member, at least one fulcrum point, and a deformable region between the force point and the fulcrum point, the deformable region being deformable due to the force transmitted from the platform via the load transmission member; a load acceptor accepting load exerted to the flexure element and connected to the fulcrum point of the flexure element, the load acceptor including a dome having a convex curved surface that protrudes toward the base, the convex curved surface of the dome of the load acceptor being point-supported by the base; a flexible plate connected to the load acceptor; and a joint part connected to the flexible plate and to the base, wherein the flexible plate allows the load acceptor to change in position with respect to the base when force is transmitted from the flexure element to the load acceptor.

By virtue of the flexible plate and the point-support for the dome on the base, the load acceptor is changeable in position (height and orientation (angle)) with respect to the base. Consequently, notwithstanding deformation of the base, the fulcrum point on the flexure element is maintained in the same orientation with respect to the direction of gravitational force. Therefore, the deformation of the deformable region of the flexure element reflects accurately the load transmitted from the load transmission member to the force point on the flexure element.

BRIEF DESCRIPTION OF THE DRAWINGS

With reference to the accompanying drawings, embodiments of the present invention will be described hereinafter. In the drawings.

DETAILED DESCRIPTION OF PREFERRED EMBODIMENTS

Figure 1:
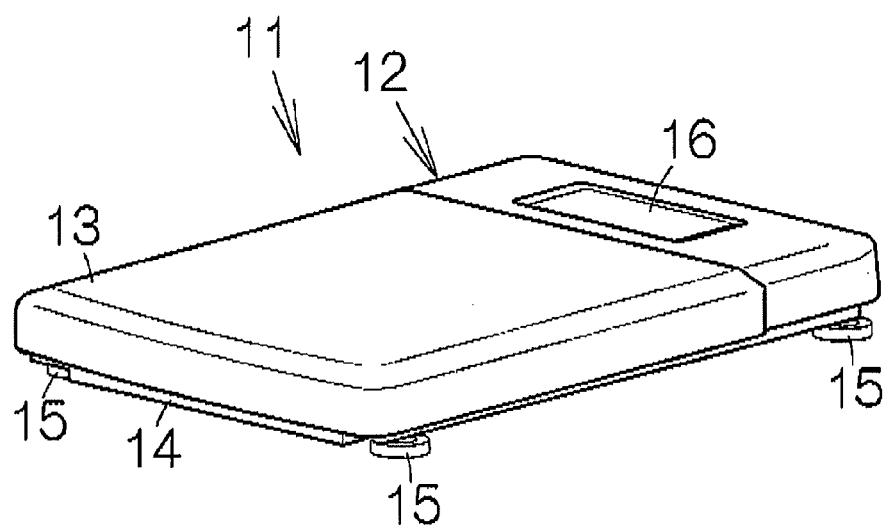
FIG. 1 is a perspective view showing the appearance of a weighing scale that is an example of a weight measurement device according to the present invention.

FIG. 1 shows a weight measurement device, i.e., a weighing scale 11 according to an embodiment of the present invention. The weighing scale 11 includes a housing 12 including a platform 13 that includes an upper surface that may be planer and horizontal. A user of the weighing scale 11 stands on the platform 13.

Figure 2:
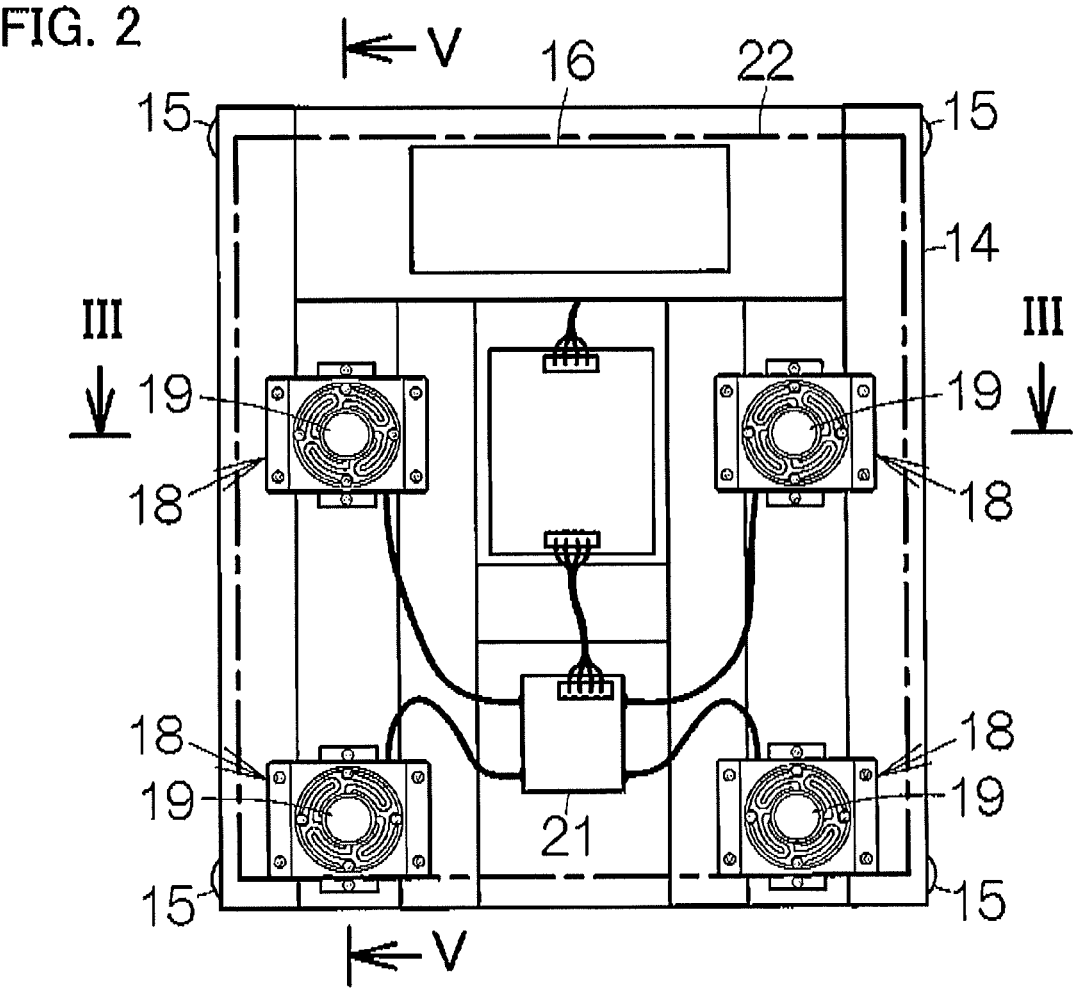
FIG. 2 is a plane view generally showing the internal construction of the weighing scale.

The housing 12 includes a base 14. The base 14 is made of a rigid material, for example, stainless steel. The base 14 is formed into a substantially rectangular shape in plane view as shown in FIG. 2. At the four corners of the rectangular shape, legs 15 are fixed. The length of each leg 15 with respect to the base 14 may be adjustable, so that the orientation of the platform 13 can be adjusted with respect to the horizontal and the upper planar surface of the platform 13 can be deployed horizontally. Such adjustment of the length of each leg 15 is achieved by, for example, providing each leg with a screw having a vertically oriented axis.

The platform 13 covers the base 14. A chamber is defined by the base 14 and the platform 13. A display panel 16 is incorporated in the housing 12 at the head of the platform 13. The screen of the display panel 16 is exposed at the upper surface of the housing 12. The screen of the display panel 16 shows biometrical information, for example, the weight value.

FIG. 2 shows a state of the weighing scale 11 in which the platform 13 is removed from the housing 12. As shown in FIG. 2, four load cell assemblies 18 are fixed to the base 14. Each load cell assembly 18 includes a load transmission member 19 displaceable in the vertical direction, i.e., the direction of gravitational force. The load exerted on the platform 13 is transmitted to the four load transmission members 19, and further to four load cells 37 (shown in FIG. 3). The load exerted on each load transmission member 19 is converted into an electric signal that indicates the load on the load transmission member 19.

The housing 12 incorporates a weight measurement board 21 on which a weight measurement circuit is formed. Load cells within the load cell assemblies 18 are electrically connected to the weight measurement board 21, so that the electric signals generated by the load cells are supplied to the weight measurement board 21. Based on the supplied electric signals, the weight measurement board 21 determines the load applied onto the platform 13, and generates measurement data indicating the load. The measurement data is supplied to the display panel 16 in order that the display panel 16 can display the weight value, i.e., the body weight.

As shown in FIG. 2, four load cell assemblies 18 are arranged in the rectangular cuboid chamber 22 defined by the base 14 and the platform 13. The axes of the four legs 15 are near the periphery of the rectangular cuboid chamber 22, and therefore, the axes of the load cell assemblies 18 (the application points of the force from the platform 13 to the base 14) are not coincident with the axes of the legs 15. When a user stands on the platform 13, not only the platform 13, but also the base 14 bends. The degree of displacement of the base 14 in the vertical direction due to the load on the platform 13 is greater at a point nearer the intersection of the diagonal lines connecting the axes of the legs 15 (the center point of the rectangular housing 12) in comparison with another point farther from the intersection. Accordingly, the foundations of the individual load cell assemblies 18 will have different displacements and different angles with respect to the horizontal.

Figure 3:
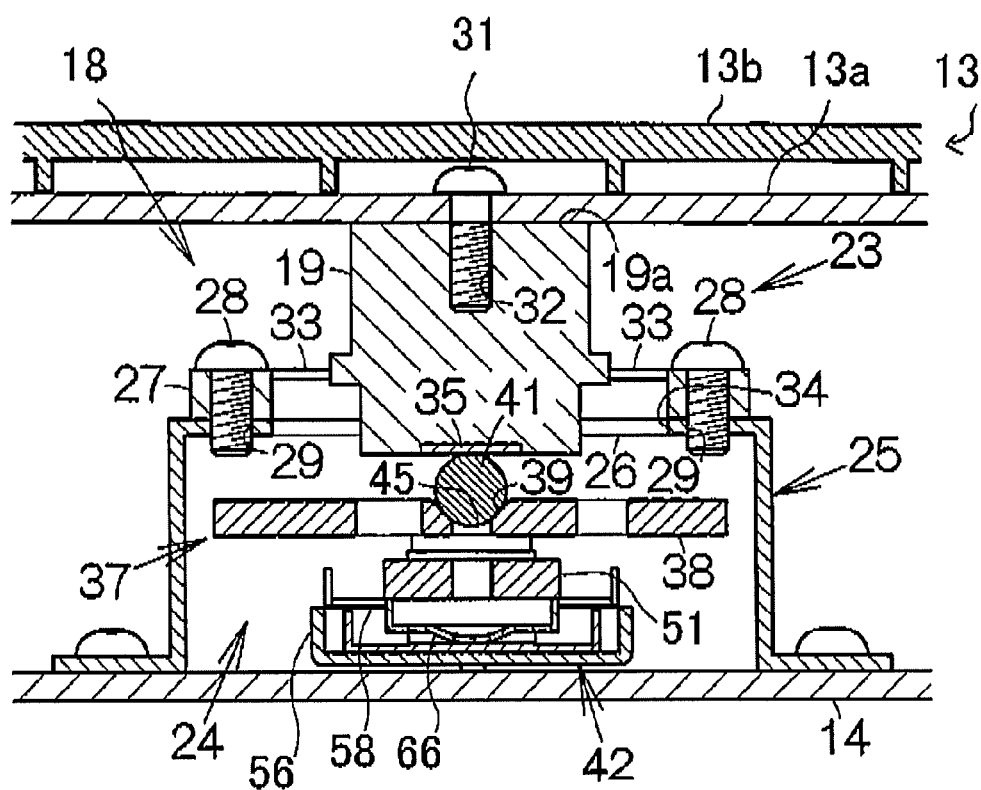
FIG. 3 is an enlarged cross sectional view taken along line 3-3 in FIG. 2, showing a load transmission unit and a load cell unit in the weighing scale.

As shown in FIG. 3, the platform 13 includes a box-shaped part 13a made of steel plates and a plastic cover 13b arranged outside the box-shaped part 13a. The plastic cover 13b is the exterior of the platform 13. If the platform 13 is used in the body composition determination device 91 shown in FIG. 8 and described below, the plastic cover 13b electrically isolates the box-shaped part 13a formed of steel plates from electrodes 14a, 14b, 15a, and 15b that will be described below. On the inner surface of the plastic cover 13b, ribs are formed so as to be positioned on and brought into contact with the box-shaped part 13a made of steel plates.

Figure 7:
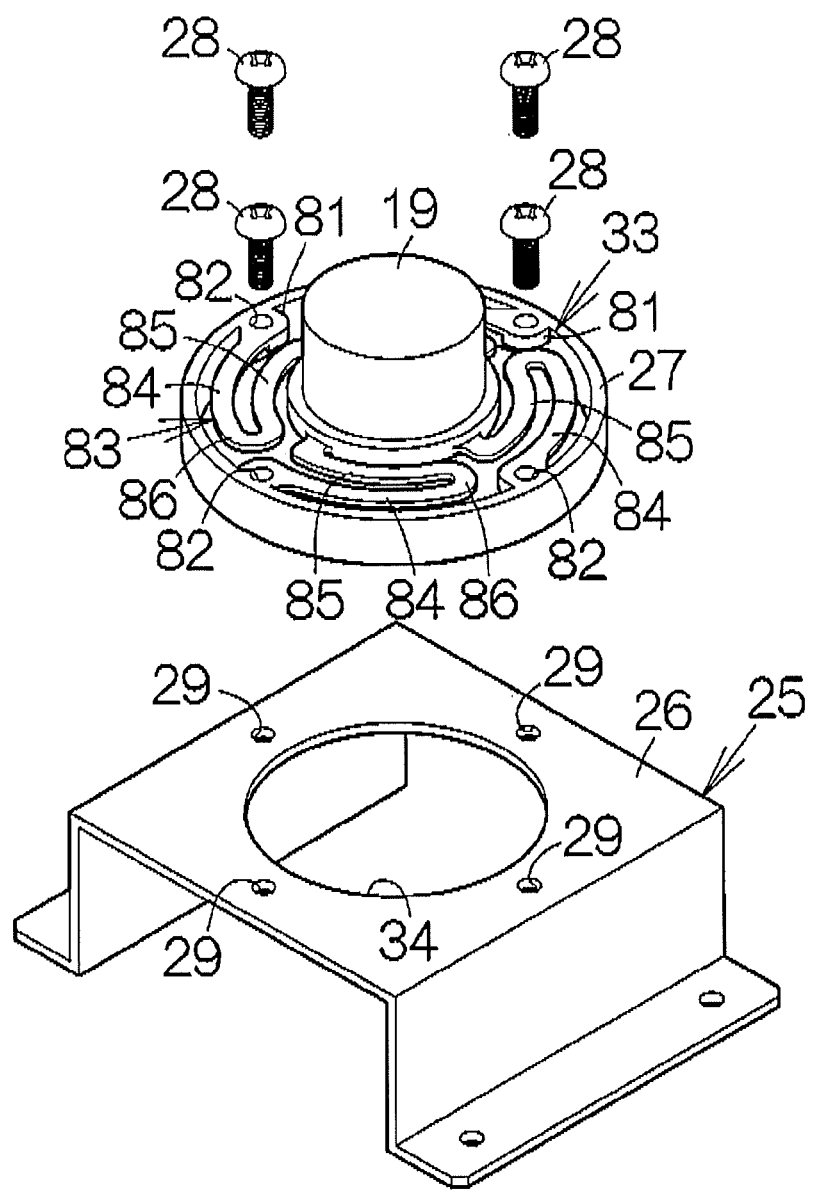
FIG. 7 is an enlarged exploded perspective view of the load transmission unit.

As shown in FIG. 3, each load cell assembly 18 includes a load transmission unit 23 and a load cell unit 24. As best shown in FIG. 7, the load transmission unit 23 includes a frame 25 fixed to the base 14, a rim 27 fixed to the frame 25, a load transmission member 19 arranged inside the rim 27, and an elastic deformation part 33 connected to the rim 27 and to the load transmission member 19.

The frame 25 is secured to the base 14 by means of, for example, screws. The frame 25 includes a support plate 26 having a predetermined height from the surface of the base 14. The support plate 26 expands parallel to the surface of the base 14.

The rim 27 is mounted on the support plate 26 of the frame 25. The rim 27 is lapped over the upper surface of the support plate 26, and is secured to the support plate 26 by means of screws 28. The screws 28 are engaged with female screw holes 29 of the support plate 26, and the rim 27 is pinched between the screw head of each screw 28 and the support plate 26. The rim 27 and the frame 25 serves as a bracket fixed to the base according to the present invention.

Inside the rim 27, the aforementioned load transmission member 19 is disposed. The cylindrical load transmission member 19 is made of, for example, a resin material that is harder than rubber. The load transmission member 19 defines a horizontal surface 19a at the top thereof as shown in FIG. 3. The platform 13 is placed on and brought into contact with the horizontal surface 19a. Accordingly, the platform 13 is directly accepted by each load transmission member 19. The load transmission member 19 is connected with the platform 13 by means of, for example, a screw 31. The screw 31 is engaged with a female screw hole 32 formed at the horizontal surface 19a of the load transmission member 19. The platform 13 is pinched between the screw head of each screw 31 and the load transmission member 19. The axes of the screws 31 are oriented so as to coincide with the direction of gravitational force.

The elastic deformation part 33 is disposed around the load transmission member 19. The elastic deformation part 33 is connected to the rim 27 and to the load transmission member 19, and allows the load transmission member 19 to change in position (height and orientation (angle)) with respect to the rim 27 when force is transmitted from the platform 13 via the load transmission member 19 to the load cell unit 24. At the support plate 26 of the frame 25, an opening 34 is formed within which the load transmission member 19 is located. The size of the opening 34 is designed such that the load transmission member 19 is prevented from contact with the opening 34 even when the position of the load transmission member 19 is changed.

The load transmission member 19, the elastic deformation part 33, and the rim 27 are integrally molded of, for example, a resin material. However, the thickness of the platform 13 is significantly smaller than those of the load transmission member 19 and the rim 27, so that the elastic deformation part 33 has an elasticity that is greater than those of the load transmission member 19 and the rim 27. Details of the integrally molded elements will be described later in more detail.

A metal plate 35 is embedded in the bottom end surface of the load transmission member 19. The lower end surface of metal plate 35 is horizontal and exposed. The metal plate 35 may be made of, for example, a stainless steel, preferably, a stainless steel preferably used for a material of plate springs.

Figure 5:
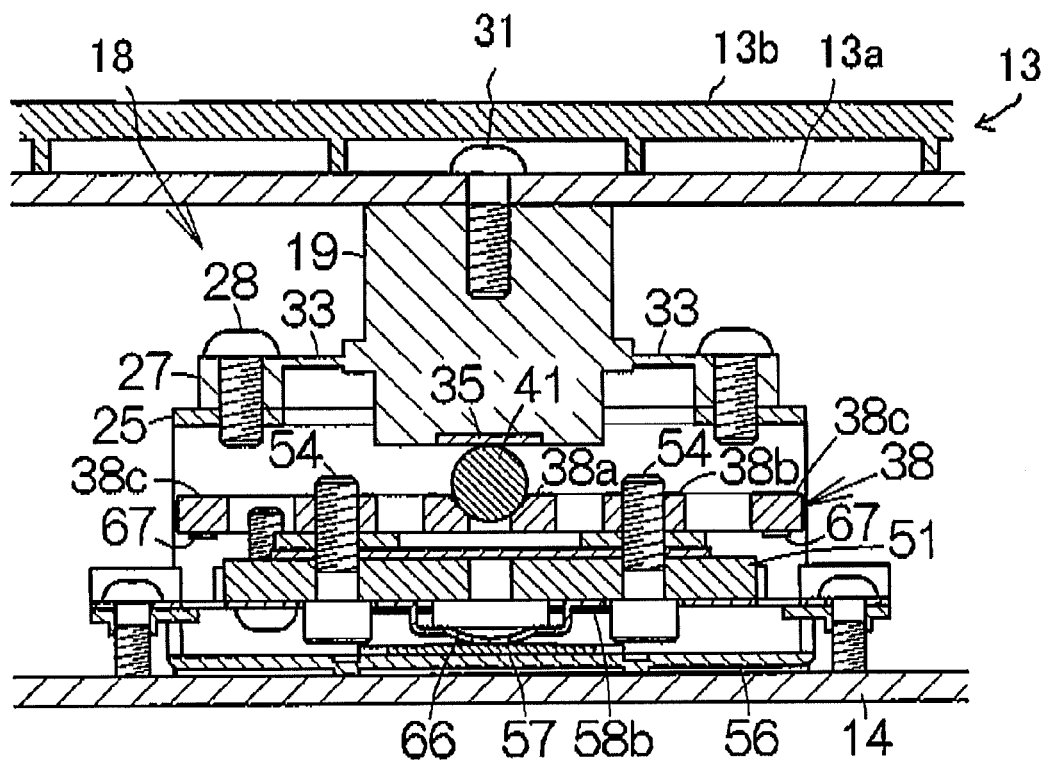
FIG. 5 is an enlarged cross sectional view taken along line 5-5 in FIG. 2, for showing the load transmission unit and the load cell unit.
Figure 6:
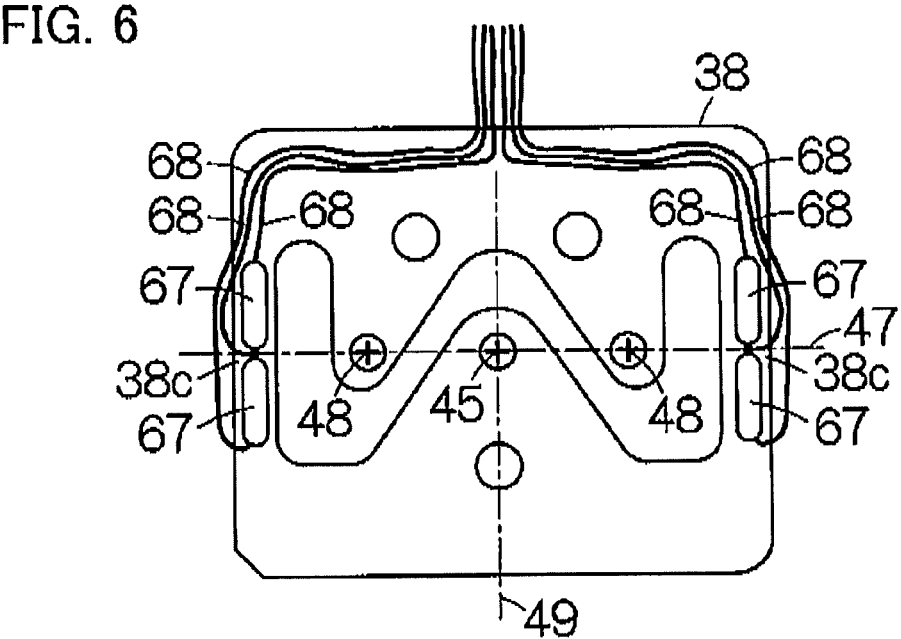
FIG. 6 is an enlarged plane view for showing a strain gauge and wirings of a flexure element of the load cell unit.

The load cell unit 24 includes a load cell 37 and a load cell support assembly 42. The load cell 37 includes a flexure element 38 and strain gauges 67 (FIGS. 5 and 6). The flexure element 38 having a force point onto which the load exerted on the platform 13 is applied via the load transmission member 19. A recess 39 is formed at the force point in which a ball 41 is disposed. The ball 41 is made of a rigid material, such as a metal. The recess 39 accepts the ball 41, preventing the ball 41 from rolling. Thus, the ball 41 is directly in contact with the flexure element 38.

A part of the ball 41 projects from the recess 39 and is brought into point-contact with the metal plate 35 at the bottom of the load transmission member 19, so as to bear the load on the platform 13. Thus, the load transmission member 19 is point-supported by the force point of the flexure element 38. However, the point-support for the load transmission member 19 on the flexure element 38 may be achieved in another suitable fashion. On the other hand, the flexure element 38 has a pair of fulcrum points to which the load cell support assembly 42 is connected. The load cell support assembly 42 is fixed to the base 14.

Figure 4:
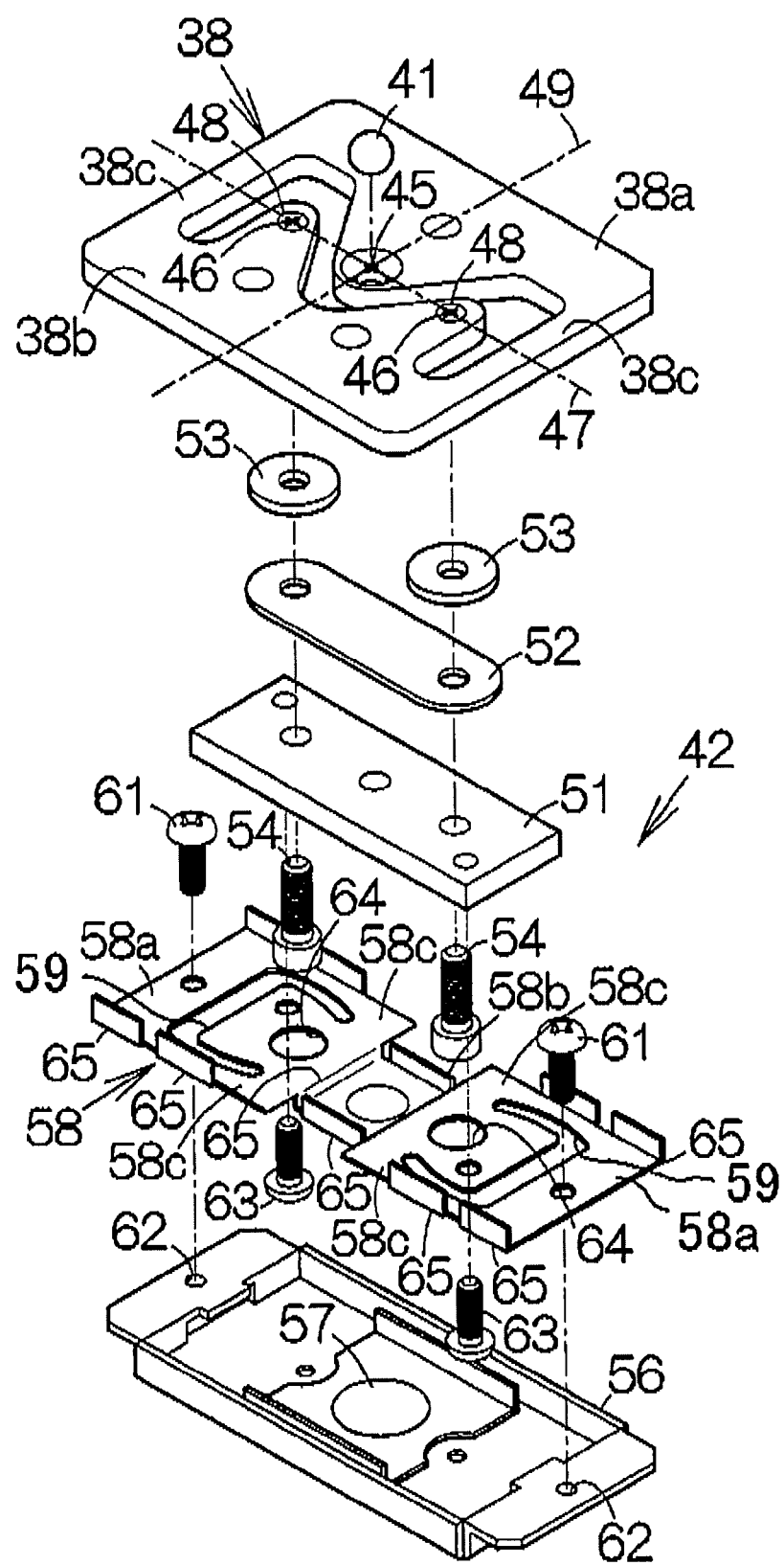
FIG. 4 is an exploded perspective view of the load cell unit.

As shown in FIG. 4, the flexure element 38 is a single panel that includes a first panel portion 38a, a second panel portion 38b, and a pair of flexure beams (deformable regions) 38c to which the first and second panel portions 38a and 38b are connected. The flexure element 38 defines a generally M-shaped groove. The first panel portion 38a includes the force point 45 on which the aforementioned recess 39 is formed for receiving the aforementioned ball 41. The second panel portion 38b includes a pair of fulcrum points 46 to which the load cell support assembly 42 is connected. The first and second panel portions 38a and 38b and the flexure beams 38c are integrally molded into a single panel having a uniform thickness and a rectangular outline. Preferably, the flexure element 38 is made of a carbon tool steel.

The force point 45 and fulcrum points 46 are located in a straight line in a horizontal on which the upper surface of the flexure element 38 is located. The force point 45 may be located at, for example, the intersection of the diagonal lines of the rectangular contour of the flexure element 38 (the center point of the flexure element 38). The force point 45 and fulcrum points 46 are aligned on the bisector 47 of the flexure element 38. The fulcrum points 46 are equally distant from the force point 45.

The flexure beams 38c traverse perpendicularly the bisector 47 that passes through the fulcrum points 46, and extend in parallel horizontally. For each flexure beam 38c, the distance between the bisector 47 and the juncture to the first panel portion 38a is the same as that between the bisector 47 and the juncture to the second panel portion 38b. As will be understood clearly from FIG. 4, the flexure element 38 has symmetry with respect to a vertical plane 49 that is orthogonal with the bisector 47 and passes through the force point 45. With such a structure of the flexure element 38, when a force or load is applied to the force point 45, deformation of both of the flexure beams 380 occurs symmetrically with respect to a vertical plane 49. At the same time, deformation of each single flexure beam 38c occurs symmetrically with respect to the intersection point of the flexure beam 38c and the bisector 47.

At each of the fulcrum points 46 of the second panel portion 38b, a through hole 48 with a female screw is formed in order that the second panel portion 38b can be connected to the load cell support assembly 42, and so that the fulcrum points 46 can be supported by the load cell support assembly 42.

The load cell support assembly 42 includes a support plate 51 made of a metal such as a steel, a common spacer 52 made of a metal such as a steel, two separation spacers 53 made of a metal such as a steel, a load concentration plate 58 made of a metal such as a stainless steel, and a bottom plate 56 made of a metal such as a steel. The support plate 51 is fixed to the second panel portion 38b of the flexure element 38 by two screws 54. The separation spacers 53 are located on the upper surface of the common spacer 52 that are located on the upper surface of the support plate 51. The body of each of the screws 54 penetrates the support plate 51, the common spacer 52, and one of the separation spacers 53 and is engaged with the female through hole 48 of the second panel portion 38b of the flexure element 38. The support plate 51, the common spacer 52, and the separation spacers 53 are pinched between the screw head of each screw 54 and the second panel portion 38b. With such a structure, the support plate 51 reinforces the rigidity of the second panel portion 38b of the flexure element 38. The separation spacers 53 allow relative displacement of the first panel portion 38a and the flexure beams 38c with respect to the second panel portion 38b.

As described above, the load cell support assembly 42 includes a bottom plate 56. The bottom plate 56 is fixedly secured to the upper surface of the base 14 by, for example, welding. On the upper surface of the bottom plate 56, a concentrated load receiving plate 57 made of, for example, a stainless steel, is fixedly secured.

The load concentration plate 58 is connected to the bottom plate 56. The load concentration plate 58 is a single integrated plate, and as shown in FIG. 4, includes a central narrow-width portion and a pair of wide-width portions at both ends. The central narrow-width portion defined by a pair of generally C-shaped grooves 59 will be referred to as a load acceptor 58b. On the other hand, each of the wide-width portions includes a joint part 58a and a pair of flexible plates 58c extending longitudinally. The flexible plates 58c of the wide-width portions are in the vicinity of the load acceptor 58b. A generally C-shaped groove 59 is formed between the pair of flexible plates 58c of each wide-width portion. The joint parts 58a are farther from the load acceptor 58b than the grooves 59.

The joint parts 58a of the load concentration plate 58 are fixed to the bottom plate 56 therebeneath by means of screws 61. Each screw 61 is oriented in the direction of gravitational force and is engaged with a through hole 62 with a female screw of the bottom plate 56. The body of each of the screws 61 penetrates the corresponding joint part 58a, and the load concentration plate 58 is pinched between the screw head of each screw 61 and the bottom plate 56.

On the other hand, the load acceptor 58b of the load concentration plate 58 is connected with the support plate 51 thereabove by means of screws 63. Each screw 63 is engaged with the support plate 51, and the body of each screw 63 penetrates the load acceptor 58b, whereby the load acceptor 58b is pinched between the screw head of each screw 63 and the support plate 51. The load acceptor 58b is thus connected with the support plate 51, and hence to the fulcrum points 46 of the flexure element 38 that are also connected to the support plate 51.

Two openings 64 are formed at the load acceptor 58b. When the support plate 51 is overlapped with the load acceptor 58b, the screw heads of the screws 54 are located within the openings 64, whereby the screws 54 are prevented from contact with the load acceptor 58b.

Each joint part 58a of the load concentration plate 58 is connected to the load acceptor 58b by the flexible plates 58c. The flexible plates 58c with the C-shaped grooves 59 allow the load acceptor 58b to change in position (height and orientation (angle)) with respect to the base 14 when force is transmitted from the flexure element 38 to load acceptor 58b.

At both side ends of the load concentration plate 58, the flexible plates 58c and the joint parts 58a include fold lines 65, so that these parts include vertically rising edges and are improved in rigidity. The vertically rising edges are discontinuous from the joint part 58a to the flexible plate 58c, so that flexible plate 58c is flexible with respect to the joint part 58a.

Additionally, the load acceptor 58b includes fold lines 65 so as to have vertically rising edges, and it is improved in rigidity.

As best shown in FIG. 5, the load acceptor 58b of the load concentration plate 58 includes a dome 66 having a convex curved (partial spherical) surface that protrudes toward the base 14. The dome 66 formed at the load acceptor 58b is placed on and is supported by the concentrated load receiving plate 57 located on the bottom plate 56. More specifically, the convex curved surface of the dome 66 is brought into point-contact with the concentrated load receiving plate 57. Thus, the load acceptor 58b of the load concentration plate 58 is point-supported by the base 14.

As mentioned above, flexible plates 58c allow the load acceptor 58b to change in position with respect to the base 14 when force is transmitted from the flexure element 38 to load acceptor 58b. When a user stands on the platform 13, the platform 13 and the base 14 bend. Since the locations of the load cell assemblies 18 including the load cells 37 are not coincident with the locations of the legs 15, the base 14 cannot be maintained horizontally when a user stands on the platform 13, and rather changes its position (height and orientation). However, the position (height and orientation) of the load acceptor 58b is also changeable with respect to the base 14 by virtue of the flexible plates 58c and the point-support for the dome 66 on the base 14. Therefore, the second panel portion 38b of the flexure element 38 above the load cell support assembly 42 can be maintained almost horizontally.

As shown in FIG. 6, four strain gauges 67 are affixed to the lower surface of the flexure element 38. More specifically, two strain gauges 67 are adhered to each of the pair of flexure beams 38c. The strain gauges 67 are located symmetrically with respect to the vertical plane including the bisector 47. At the same time, the strain gauges 67 are located symmetrically with respect to the vertical plane including the vertical plane 49. Multiple wirings 68 are electrically connected with strain gauges 67. The wirings 68 may be brought together into a single bundle that is contained in an electrically isolating sheath. Individual wiring is also covered with an electrically isolating material. From the load cell assembly 18, the wirings 68 are drawn without being pinched by any elements.

As shown in FIG. 7, the load transmission member 19 is formed in a cylinder having an axis that coincides with the direction of gravitational force. The rim 27 is formed into an annular shape placed on the support plate 26 of the frame 25. Inside the annular shape, four bosses 81 are formed and spaced apart at angular intervals of 90 degrees. A through hole 82 is formed at each boss 81 to accept the above-mentioned screws 28.

The elastic deformation part 33 includes four arms 83. Each arm 83 is made of a thin plate expanding along horizontally. The thickness of the thin plate is small so that the arms 83 are flexible. Each arm 83 includes a first curved portion 84, a second curved portion 85, and a joint portion 86 joining the portions 84 and 85. The first curved portion 84 starts with the boss 81 and extends counterclockwise in a circumferential direction about the axis of the cylinder (load transmission member 19). Each first curved portion 84 extends over an angular range that is slightly less than 90 degrees about the axis of the load transmission member 19. The second curved portions 85 are coupled with the cylinder (load transmission member 19) at four positions near the four bosses 81. Each second curved portion 85 extends from the position counterclockwise in a circumferential direction about the axis of the cylinder. Each second curved portion 85 extends over an angular range that is slightly less than 90 degrees about the axis of the load transmission member 19. The distal end of the first curved portion 84 is connected to the distal end of the second curved portion 85 via the joint portion 86. The above-mentioned shape of each arm 83 facilitates elastic deformation of the elastic deformation part 33.

When the user stands on the platform 13, the weight of the user is applied onto the platform 13. As is clear from FIG. 3, the weight of the body is transmitted to the individual load transmission members 19. Each load transmission member 19 having less elasticity transmits the entire load exerted on the load transmission member 19 to the force point 45 of the flexure element 38 with negligible loss of load. Accordingly, the entire load exerted on the load transmission member 19 is applied to the flexure element 38 and deforms the flexure beams 38c of the flexure element 38 with negligible loss of load. As a result, each load cell 37 can generate an electric signal that is accurately responsive to the weight exerted thereon, and whereby the body weight of the user can be accurately measured.

When the user stands on the platform 13, the platform 13 and the base 14 bend. Due to deformation of the platform 13, the position of the load transmission member 19 is changeable. Since the position of the load transmission member 19 is not bound rigidly by the elastic deformation part 33 having greater elasticity, the entire load exerted on the load transmission member 19 is transmitted to the force point 45 of the flexure element 38 with negligible loss of load. The elastic deformation part 33 is located around the load transmission member 19, and the elastic deformation part 33 and any other large-deformation element are not interposed between the platform 13 and the flexure element 38. Therefore, the interval between the platform 13 and the base 14 can be minimized, so that the housing 12 of the weighing scale 11 is made thinner.

In addition, as described above, by virtue of the flexible plates 58c and the point-support for the dome 66 on the base 14, the load acceptor 58b of the load concentration plate 58 is changeable in position with respect to the base 14. Consequently, notwithstanding deformation of the base 14, the second panel portion 38b of the flexure element 38 above the load cell support assembly 42 can be maintained almost horizontally, i.e., each of the fulcrum points 46 on the second panel portion 38b is maintained in the same orientation with respect to the direction of gravitational force. Therefore, the deformation of the flexure beams 38c (deformable regions) of the flexure element 38 reflects accurately the load transmitted from the load transmission member 19 to the force point 45 on the first panel portion 38a of the flexure element 38.

Figure 8:
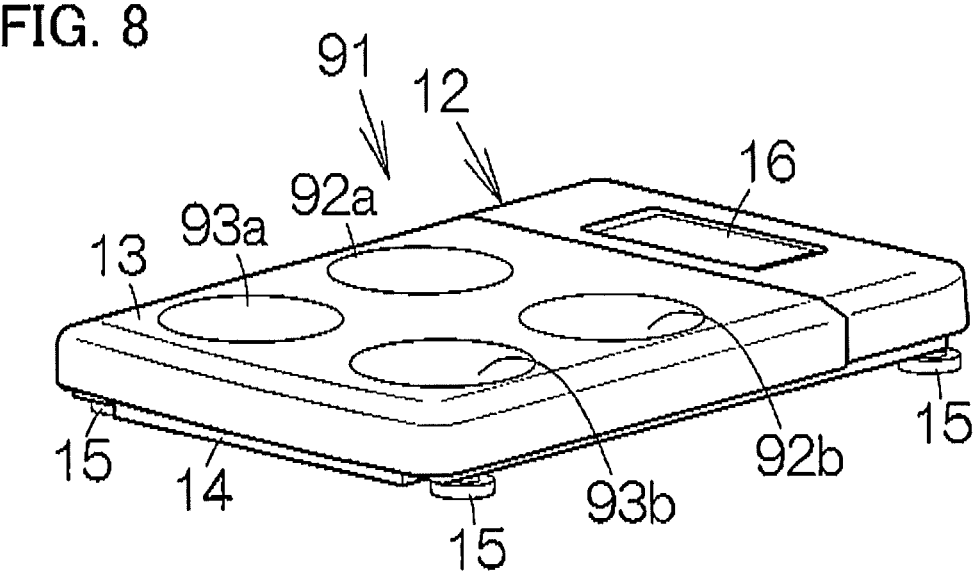
FIG. 8 is a perspective view showing the appearance of a body composition determination device that is an example of a weight measurement device according to the present invention.

The weight measurement device according to the present invention includes not only the above-described weighing scale 11, but also, for example, a body composition determination device. As shown in FIG. 8, a body composition determination device 91 includes, for example, current-supplying electrodes 92a and 92b and voltage-applying electrodes 93a and 93b. The current-supplying electrodes 92a and 92b and the voltage-applying electrodes 93a and 93b are arranged on the platform 13.

When a user of the body composition determination device 91 stands on the platform 13, the left sole of the user is in contact with the left current-supplying electrodes 92a and the left voltage-applying electrodes 93a. At the same time, the right sole of the user is in contact with the right current-supplying electrodes 92b and the right voltage-applying electrodes 93b. The current-supplying electrodes 92a and 92b supply alternating current with specific frequencies to the user, i.e., the living subject. Voltages of the user are measured via the voltage-applying electrodes 93a and 93b. As a result, multiple bioimpedances of the user are determined. On the basis of the body weight and the bioimpedances, various body composition indexes are calculated, for example, but not limited to, subcutaneous fat thickness, abdominal muscle thickness, subcutaneous fat area, visceral fat area, total fat area of the abdomen, fat ratio of the torso, and fat ratio of the entire body.

In addition to the electrodes, the impedance determination system, and the body composition index calculation system, the body composition determination device 91 is similar in structure to the above-described weighing scale 11. In FIG. 8, the same reference symbols are used to identify the elements equivalent to those of FIG. 1.

Although not illustrated, the weight measurement device according to the present invention includes another body composition determination device that includes the same structure as in FIG. 8 and a handle gripped by both hands. The handle is provided with one or more current-supplying electrodes and one or more voltage-applying electrodes for the right hand, and one or more current-supplying electrodes and one or more voltage-applying electrodes for the left hand. The weight measurement device according to the present invention also includes another body composition determination device that has a column mounted on the platform and supporting a display panel.

While the present invention has been illustrated with specific aspects and described with reference to preferred embodiments thereof, it will be understood by those skilled in the art that various changes in form and details may be made therein without departing from the spirit and scope of the invention as claimed in the claims. Such variations, alterations, and modifications are intended to be encompassed in the scope of the present invention.

What is claimed is:

1. A weight measurement device comprising:
a housing comprising a base, a platform located above the base and on which a subject is placed or stands, and a chamber defined by the base and the platform;
at least one load cell contained in the chamber and supported by the base;
a load transmission member located between the platform and the load cell;
a bracket fixed to the base;
an elastic deformation part located around the load transmission member and connected to the bracket and to the load transmission member, the elastic deformation part having an elasticity that is greater than that of the load transmission member, wherein the elastic deformation part allows the load transmission member to change in position with respect to the bracket when force is transmitted from the platform via the load transmission member to the load cell;
a flexure element incorporated in the load cell and comprising a force point onto which force is applied from the load transmission member, at least one fulcrum point, and a deformable region between the force point and the fulcrum point, the deformable region being deformable due to the force transmitted from the platform via the load transmission member;
a load acceptor accepting load exerted to the flexure element and connected to the fulcrum point of the flexure element, the load acceptor comprising a dome having a convex curved surface that protrudes toward the base, the convex curved surface of the dome of the load acceptor being point-supported by the base;
a flexible plate connected to the load acceptor; and
a joint part connected to the flexible plate and to the base, wherein the flexible plate allows the load acceptor to change in position with respect to the base when force is transmitted from the flexure element to the load acceptor.

* * * * *